United States Patent [19]
Stollberg et al.

[11] 4,069,917
[45] Jan. 24, 1978

[54] CONTAINER

[75] Inventors: Ray Harold Stollberg, Antioch; James Vernon Boling, Walnut Creek, both of Calif.

[73] Assignee: Crown Zellerbach Corporation, San Francisco, Calif.

[21] Appl. No.: 787,414

[22] Filed: Apr. 14, 1977

[51] Int. Cl.² .............................................. B65D 85/52
[52] U.S. Cl. ........................................ 206/423; 47/84; 229/37 E; 229/39 R
[58] Field of Search ........... 206/423; 229/37 R, 37 E, 229/38, 39 R, 39 B, 33, 36; 47/34.11, 84–87

[56] References Cited

U.S. PATENT DOCUMENTS

| 2,421,748 | 6/1947 | Fink | 229/39 B X |
|---|---|---|---|
| 2,682,949 | 7/1954 | Whitehead | 229/39 B X |
| 2,721,022 | 10/1955 | Billerbeck | 206/423 X |
| 3,342,329 | 9/1967 | Knight | 206/423 |
| 3,450,330 | 6/1969 | Pierce, Jr. | 229/33 |
| 3,521,741 | 7/1970 | Beaudry | 229/37 E X |

FOREIGN PATENT DOCUMENTS

| 209,618 | 1/1924 | United Kingdom | 229/39 B |
|---|---|---|---|
| 437,698 | 11/1935 | United Kingdom | 229/39 B |

Primary Examiner—Stephen Marcus
Attorney, Agent, or Firm—Thomas R. Lampe

[57] ABSTRACT

A container for nursery plants and the like formed of a blank of sheet material comprising a front panel, a back panel and two side panels interconnected along spaced fold lines. A front reinforcement panel is connected to the top of the front panel along a fold line for securing to the inner face of the front panel. A top closure panel is hingedly secured along a hinge line to the terminal end of the front reinforcement panel for extension into the tubular area defined by the front, back and side panels when secured together. Upstanding attachment tabs are attached to opposed sides of the top panel and a side reinforcement panel is connected to the top of each side panel along a fold line for securing to the inner face of its associated side panel. A top shoulder panel is hingedly secured to each of the side reinforcement panels along a hinge line, said shoulder panels adapted to overlie the top closure panel and the attachment tabs adapted for insertion between the side panels and the side reinforcement panels to provide an upper limit to movement of the top closure panel about the hinge line connecting the top closure panel to the terminal end of the front reinforcement panel.

8 Claims, 7 Drawing Figures

CONTAINER

FIELD OF THE INVENTION

The present invention relates to an improved container construction, and in particular to an improved container for nursery plants and the like. The container of the invention is formed from a unitary blank and due to its improved construction machine assembly of the container is facilitated as is the filling thereof with the nursery plant or the like which it is adapted to hold.

BACKGROUND OF THE INVENTION

A number of containers are known in the prior art for the storage and transport of nursery plants and the like. Some of these containers are not only used for the transport and storage of the plant, for example rose plants, but may also be planted by the purchaser along with the plant. This approach minimizes disturbance of the plant root system and enables the gardener to avoid the dirt and mess that often accompany the planting procedure.

One plant container of the plantable type is disclosed in U.S. Pat. No. 3,521,741, issued July 28, 1970, to G. A. Beaudry. The plantible container shown in that patent is of tubular construction and the rose bush, shrub or the like which is to be placed into the container is inserted therein through the open top thereof. Because the plant is pushed down into the container from the top, it is difficult for the operator to ensure proper placement of the plant root structure and ensure that such roots are completely surrounded by the potting materials such as peat moss and the like, already inserted in the container.

OBJECTS OF THE INVENTION

Accordingly, it is an object of the present invention to provide an improved container adapted to receive nursery plants and the like which is particularly adapted to receive a plant and potting material therefor from the side, whereby the operator can more readily observe and control root placement and ensure that no voids in the potting mix occur in the vicinity of the roots.

It is another object of the present invention to provide an improved arrangement for placement and securance of the top closure panel by the operator. Yet another object is to provide a container readily adapted for machine assembly.

SUMMARY OF THE INVENTION

The above-noted objects have been attained by providing a blank of sheet material for formation into a container adapted to receive nursery plants and the like comprising a front panel, a back panel and two side panels interconnected along spaced fold lines. A glue flap is associated with at least one of the panels and is adapted to secure the panels into a tubular configuration. At least one bottom panel is secured to one of the aforesaid panels and a front reinforcement panel is hingedly secured to the top panel. Hingedly secured to the front reinforcement panel is a top closure panel and side reinforcement panels are hingedly secured to each of the side panels. A top shoulder panel is hingedly secured to each of said side reinforcement panels along a hinge line, each said hinge line being interrupted by a positioning tab formed by two spaced lines of cut extending from the hinge line interconnected by a third line of cut disposed substantially parallel to the hinge line. The container is partially assembled, preferably by machine, and the nursery plant or the like is inserted into the container before the back panel is secured into position. Prior to securing of the back panel into position the top closure panel is brought forward into engagement with the top shoulder panels so that the shoulder panels overlie same. Attachment tabs connected to the sides of the top closure panel are inserted between the side panels and the side reinforcement panels and the positioning tabs bias the side reinforcement panels away from their associated side panels to facilitate placement of the attachment tabs therebetween. The back panel is then secured into position by the glue flap.

For a better understanding of the present invention, reference should be had to the attached drawings wherein.

DETAILED DESCRIPTION

Figure 1:
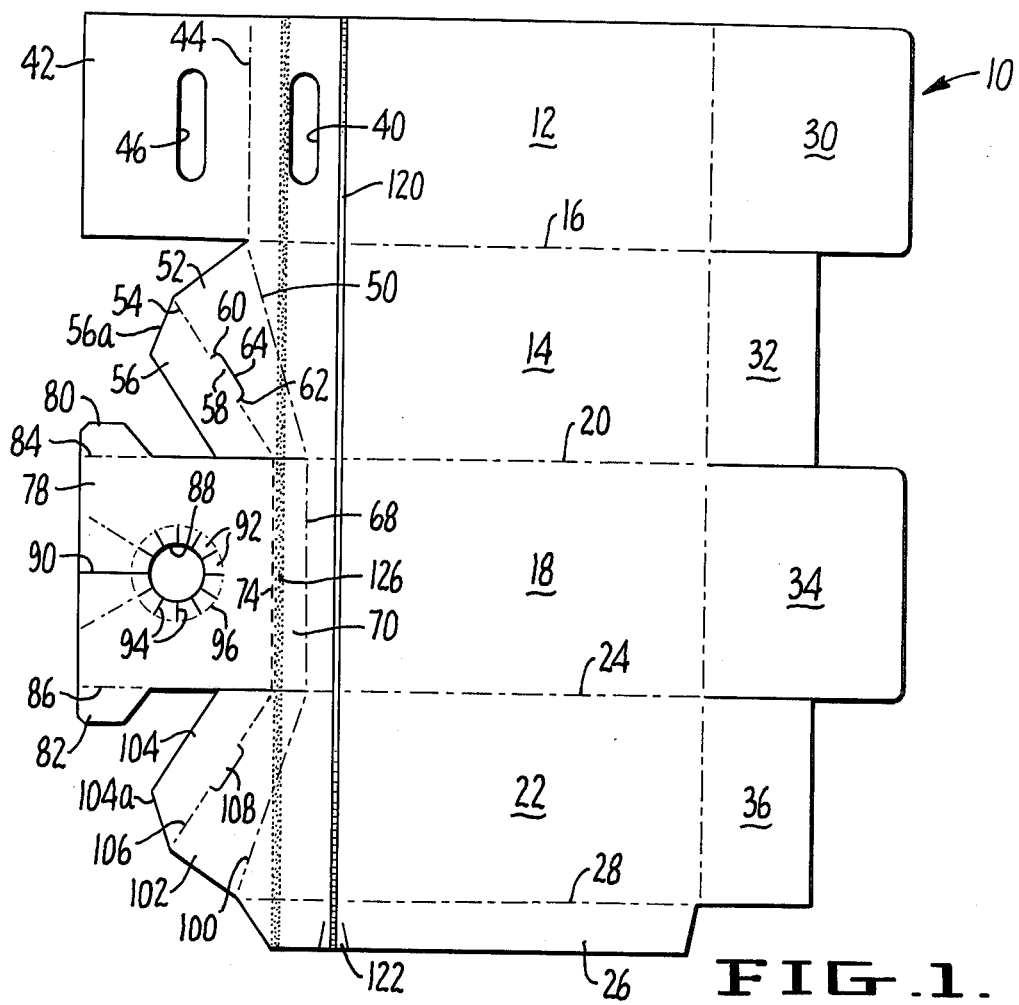
FIG. 1 is a plan view of the unitary blank of the present invention.

Referring now to FIG. 1, the blank 10 of the present invention is illustrated. The blank is constructed of any suitable sheet material such as corrugated paperboard and includes a back panel 12, a side panel 14 connected to the back panel along hinge line 16, a front panel 18 connected to side panel 14 along hinge line 20, and a second side panel 22 connected to front panel 18 along hinge line 24. Securing means in the form of glue flap 26 is connected to side panel 22 along hinge line 28. Hingedly connected to panels 12, 14, 18 and 22 are, respectively, bottom panels 30, 32, 34 and 36.

An aperture of handhole 40 is formed in back panel 12 at the end thereof remote from panel 30. A back reinforcement panel 42 is hingedly secured to back panel 12 along hinge line 44. The back reinforcement panel is adapted to be folded along hinge line 44 into side by side relationship therewith, with a handhole 46 formed in the back reinforcement panel 42 being brought into alignment with handhole 40.

Hingedly secured to side panel 14 along hinge line 50 is a side reinforcement panel 52. Spaced from hinge line 50 is a hinge line 54 which connects a top shoulder panel 56 having an end 56a to side reinforcement panel 52. End 56a is cut on a bias so that it defines an acute angle relative to hinge line 54. Hinge line 54 is interrupted by a positioning tab 58 formed by two spaced lines of cut 60, 62 extending from hinge line 54 interconnected by a third line of cut 64 which is disposed substantially parallel to hinge line 54.

Connected to front panel 18 along a hinge line 68 is a front reinforcement panel 70. Spaced from hinge line 68 is a second hinge line 74 which connects a top closure panel 78 to front reinforcement panel 70. Integrally connected to the sides of top closure panel 78 at locations spaced from hinge line 74 are a pair of opposed attachment tabs 80 and 82. The tabs are connected to the top closure panel 78 along hinge lines 84 and 86. A circular aperture 88 is formed in top closure panel 78 and a line of cut 90 extends from aperture 88 to the outermost edge of top closure panel 78. The outer periphery of aperture 88 is defined by wedge-shaped members 92 defined by lines of cut 94 and a circular-shaped hinge line 96.

Connected to the second side panel 22 along a hinge line 100 is a side reinforcement panel 102. A top shoulder panel 104 is connected to side reinforcement panel 102 along a hinge line 106 which, similarly to hinge line 54, is interrupted by a positioning tab 108 defined by three interconnecting lines of cut. End 104a of top shoulder panel 104 is cut on a bias and defines an acute angle relative to hinge line 106. Extending across the full length of blank 10 across panels 12, 14, 18 and 22 is a tear-strip 120 having a starting tab 122 connected to the end thereof and formed by lines of cut in glue flap 26.

Figure 2:
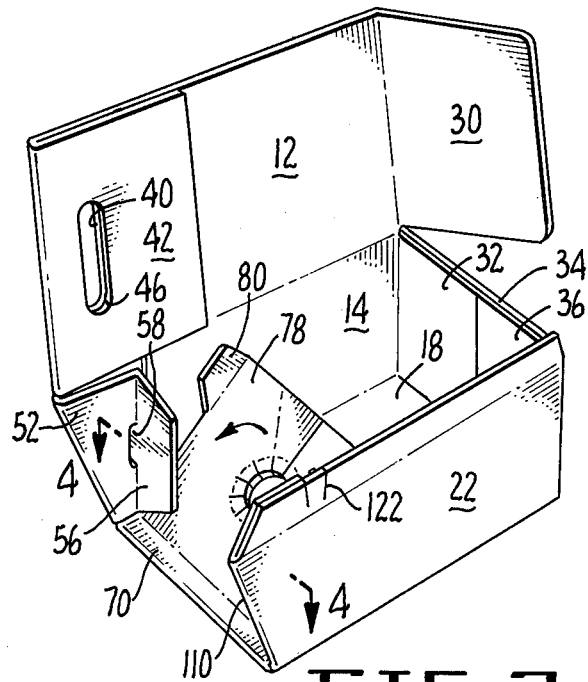
FIG. 2 is an isometric view of the blank of FIG. 1 partially assembled with the top closure panel thereof illustrated as being moved to its final position.
Figure 4:
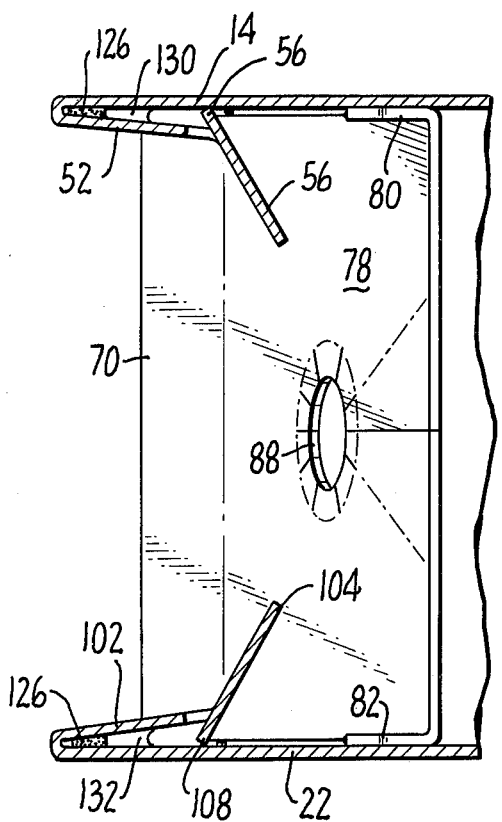
FIG. 4 is a cross-sectional view taken along line 4—4 of FIG. 2.

Referring now to FIGS. 2 and 4, blank 10 is shown as being partially assembled and in a condition to receive the nursery plant or the like which is to be placed into the container. In said condition back reinforcement panel 42 is folded inwardly into engagement with back panel 12 so that apertures 40 and 46 are in alignment. Back reinforcement panel 42 is held in such position due to prior application of adhesive along a strip identified by reference numeral 126 (FIG. 1). Since the adhesive strip is positioned along a straight line its application by conventional adhesive applying equipment is facilitated.

Figure 5:
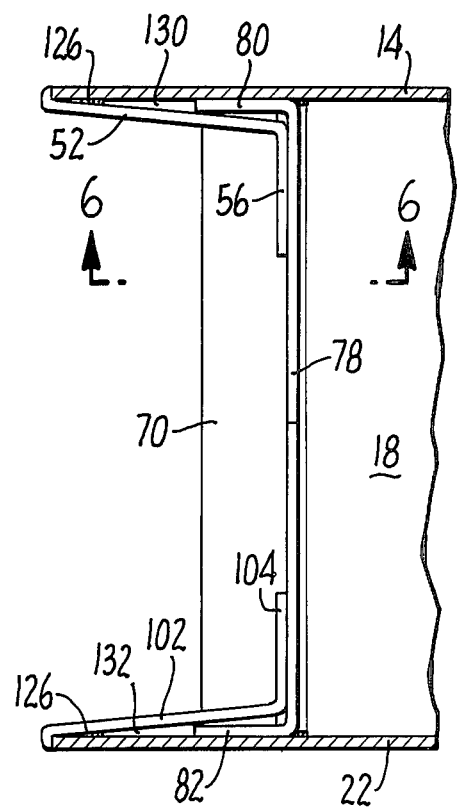
FIG. 5 is a cross-sectional view taken along line 5—5 of FIG. 3.
Figure 6:
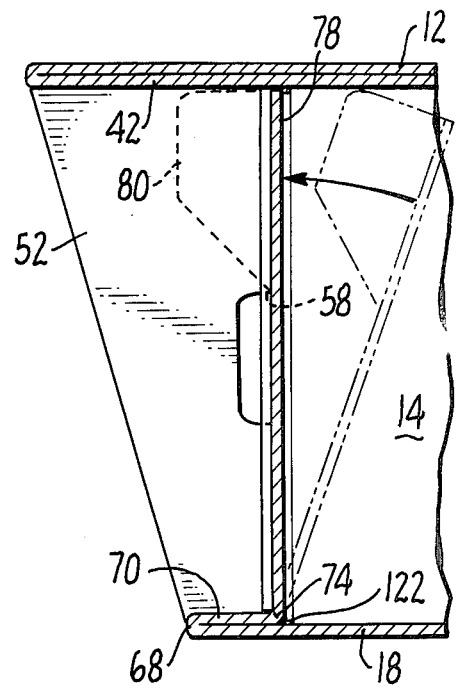
FIG. 6 is a cross-sectional view taken along line 6—6 of FIG. 5.

In the partially assembled condition of FIGS. 2 and 4, which is preferably accomplished by suitable machinery, the adhesive strip also holds side reinforcement panels 52 and 102 in side by side relationship with their respective side panels 14 and 22. Likewise, the adhesive strip serves to maintain front reinforcement panel 70 superposed relative to a portion of front panel 18. In the condition of FIGS. 2 and 4, the top closure panel 78 is positioned in the interior of the container as defined by panels 14, 18 and 22 and top shoulder panels 56 and 104 have been bent about their respective hinge lines 54 and 106 so that they are disposed out of alignment with their respective side reinforcement panels 52, 102. The operator then pushes top closure panel 78 in the direction of the arrow shown in FIG. 2 so that the beveled ends 56a and 104a of the top shoulder panels cam against the outer surface of the top closure panel 78. This camming action serves to force top shoulder panels 56 and 104 further about their respective hinge lines and as a consequence thereof positioning tabs 58 and 108 bear against panels 14 and 22. This action may be seen most clearly with reference to FIG. 4. The interaction between the positioning tabs and their associated side panels forces the non-adhesively-secured portions of side reinforcement panels 52 and 102 away from their associated side panel walls so that gaps are formed therebetween, the gap between side reinforcement panel 52 and side panel 14 being identified by reference numeral 130 and that formed between side reinforcement panel 102 and side panel 22 being identified by reference numeral 132. As the top closure panel 78 continues to move, attachment tabs 80, 82 associated therewith enter gaps 130, 132 and finally, top closure panel 78 is brought into the position illustrated in FIGS. 3, 5 and 6 with the attachment tabs 80, 82 fully seated in gaps 130, 132 and the top shoulder panels 56 and 104 in overlapping face to face engagement with top closure panel 78. Frictional engagement between the attachment tabs and their respective side panels and side reinforcement panels serves to retain the top closure panel 78 in the position illustrated in FIGS. 3 and 5.

Figure 3:
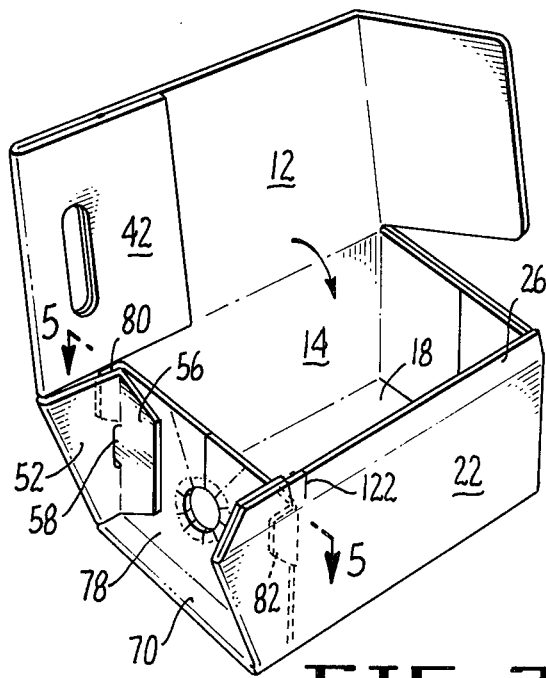
FIG. 3 is a view similar to that of FIG. 2 but illustrating the top closure panel secured into final position.
Figure 7:
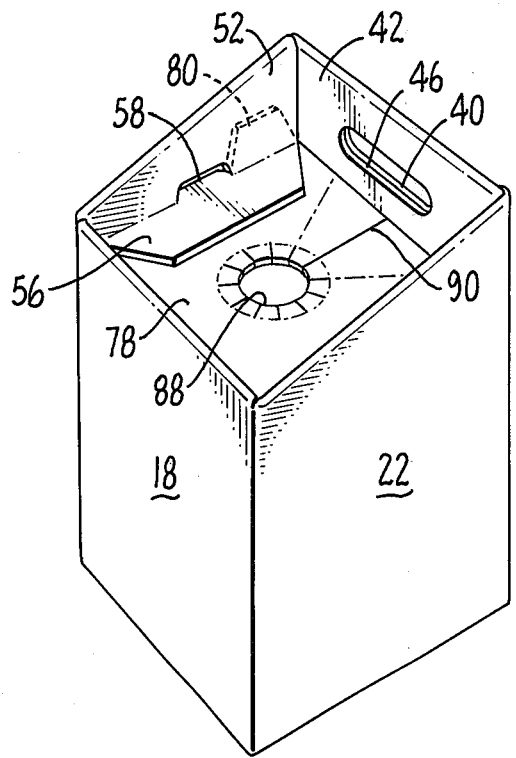
FIG. 7 is an isometric view of the fully assembled container formed by the erection of the blank of FIG. 1 showing details of the upper end thereof.

The operator is now ready to fill the container and as is readily apparent with reference to FIG. 3, the fully interior of the container is readily accessible by the operator for this purpose, i.e. access is provided to the interior of the container along the full length and width thereof rather than through a restricted top closure opening as is the case for example with regard to the box of U.S. Pat. No. 3,521,741. The operator may thus dispose the roots of the nursery plant, such as a rose bush, in any desired manner and can readily observe the disposition of such roots as well as ensure that such roots are adequately surrounded by potting material prior to complete closure thereof. It will be appreciated that the upper stem portion of the plant is to be positioned within aperture 88 through line of cut 90, the members 92 flexing as necessary to accommodate the upper stem portion. After the operator is satisfied that the container is properly packed, back panel 12 is folded in the direction of the arrow shown in FIG. 3 so tha the interior of the container is closed. Bottom flap 34 is then adhesively sealed or otherwise secured to the other bottom flaps and glue flap 26 is brought into overlapping relationship with the outer surface of back panel 12 and glued or otherwise secured thereto. The fully assembled container is illustrated in FIG. 7. After purchase and prior to planting, the customer may remove the top portion thereof by pulling tear strip 120.

What is claimed is:

1. A blank of sheet material for formation into a container adapted to receive nursery plants and the like comprising a front panel, a back panel and two side panels interconnected along spaced fold lines, securing means associated with at least one of said panels adapted to secure said panels into a tubular configuration, at least one bottom panel secured to one of the aforesaid panels, a front reinforcement panel hingedly secured to said front panel, a top closure panel hingedly secured to said front reinforcement panel, a side reinforcement panel hingedly secured to each of said side panels, a top shoulder panel hingedly secured to each of said reinforcement panels along a hinge line, each said hinge line being interrupted by a positioning tab extending from the hinge line.

2. The blank of claim 1 wherein at least one end of each of said top shoulder panels is cut on a bias so that it defines an acute angle relative to the hinge line connecting the top shoulder panel to its associated side reinforcement panel.

3. The blank of claim 1 wherein a pair of opposed attachment tabs are hingedly connected to the sides of said top closure panel at locations spaced from a hinge line hingedly securing the top closure panel to the front reinforcement panel.

4. The blank of claim 1 wherein the sheet material is corrugated paperboard.

5. The blank of claim 1 wherein a first side panel, the back panel, a second side panel and the front panel are connected together in seriatim along parallel hinge lines, the securing means comprising a glue flap hingedly attached to one of front panel or the first side panel to secure the front and first side panels together upon formation of the blank into a container.

6. A container adapted to receive nursery plants and the like comprising a front panel, two side panels and a back panel secured together into a tubular configuration, at least one bottom panel secured to the aforesaid panels to provide a bottom closure, a front reinforcement panel connected to the top of said front panel along a fold line and secured to the inner face of the front panel, a top closure panel hingedly secured along a hinge line to the terminal end of the front reinforcement panel and extending into the tubular area defined by the front, back and side panels, a pair of upstanding attachment tabs attached to opposed sides of said top closure panel, a side reinforcement panel connected to the top of each side panel along a fold line and secured to the inner face of its associated side panel, a top shoulder panel hingedly secured to each of said side reinforcement panels along a hinge line, said shoulder panels adapted to overlie said top closure panel and said attachment tabs adapted for insertion between the side panels and the side reinforcement panels to provide an upper limit to movement of the top closure panel about the hinge line connecting the top closure panel to the terminal end of the front reinforcement panel, and a positioning top extending front the hinge line connecting each said top shoulder panel to its associated side reinforcement panel.

7. The container of claim 6 wherein the positioning tabs are each formed by two spaced lines of cut extending from the hinge line interconnected by a third line of cut spaced from the hinge line.

8. The container of claim 6 wherein at least one end of each of said top shoulder panels is cut on a bias so that it defines an acute angle relative to the hinge line connecting the top shoulder panel to its associated side reinforcement panel.

* * * * *